(12) United States Patent
Verwaest

(10) Patent No.: US 9,544,096 B2
(45) Date of Patent: Jan. 10, 2017

(54) PACKET RETRANSMISSION METHOD IN A WIRELESS TRANSMITTER

(75) Inventor: Frederik Verwaest, Edegem (BE)

(73) Assignee: THOMSON LICENSING, Issy les Moulineaux (FR)

(*) Notice: Subject to any disclaimer, the term of this patent is extended or adjusted under 35 U.S.C. 154(b) by 185 days.

(21) Appl. No.: 13/805,077

(22) PCT Filed: Jun. 20, 2011

(86) PCT No.: PCT/EP2011/060261
§ 371 (c)(1),
(2), (4) Date: Feb. 28, 2013

(87) PCT Pub. No.: WO2011/157854
PCT Pub. Date: Dec. 22, 2011

(65) Prior Publication Data
US 2013/0212446 A1    Aug. 15, 2013

(30) Foreign Application Priority Data

Jun. 18, 2010   (EP) .................................... 10447015
Aug. 13, 2010   (EP) .................................... 10447018

(51) Int. Cl.
*H04L 1/18*   (2006.01)
*H04L 1/08*   (2006.01)
*H04W 74/08*  (2009.01)

(52) U.S. Cl.
CPC .............. *H04L 1/08* (2013.01); *H04L 1/1877* (2013.01); *H04L 1/1887* (2013.01); *H04W 74/0858* (2013.01)

(58) Field of Classification Search
CPC ....... H04L 1/1816; H04L 1/1825; H04L 25/05
See application file for complete search history.

(56) References Cited

U.S. PATENT DOCUMENTS 7,020,822 B2   3/2006  Ho et al.
7,436,854 B2   10/2008 Miyake et al.
7,668,968 B1   2/2010  Smith
(Continued)

FOREIGN PATENT DOCUMENTS

CN   1702993       11/2005
JP   2007096933    4/2007
(Continued)

OTHER PUBLICATIONS 802 11 TGN Working Group:"IEEE 802.11n Part 11: Wireless LAN Medium Access Control (MAC) and Physical Layer (PHY) specifications: Enhancements for Higher Throughput" IEEE 802.11 Standards.
(Continued)

*Primary Examiner* — M. Mujtaba Chaudry
(74) *Attorney, Agent, or Firm* — Brian J. Dorini; Catherine A. Cooper

(57) ABSTRACT

The present invention concerns a wireless device and a method at a wireless device for transmitting a packet, said method comprising the steps of setting a lifetime value to a packet to transmit and, while the packet lifetime has not expired and the packet transmission fails: retransmitting the packet up to a retry limit, and suspending transmitting said packet during a pause time before transmitting the packet up to a retry limit.

10 Claims, 2 Drawing Sheets

(56) References Cited

U.S. PATENT DOCUMENTS

| | | | |
|---|---|---|---|
| 7,715,314 | B2 | 5/2010 | Igarashi et al. |
| 2003/0103459 | A1 | 6/2003 | Connors et al. |
| 2005/0265297 | A1 | 12/2005 | Nakajima et al. |
| 2006/0095944 | A1* | 5/2006 | Demircin et al. ............... 725/81 |
| 2006/0262718 | A1* | 11/2006 | Li et al. ......................... 370/229 |
| 2007/0115847 | A1* | 5/2007 | Strutt et al. .................... 370/252 |
| 2007/0183451 | A1 | 8/2007 | Lohr et al. |
| 2007/0201364 | A1* | 8/2007 | Nakajima et al. ............ 370/230 |
| 2008/0144550 | A1 | 6/2008 | Makhlouf et al. |
| 2008/0209297 | A1 | 8/2008 | Chandra et al. |
| 2010/0037124 | A1 | 2/2010 | Hoshi et al. |
| 2010/0157962 | A1 | 6/2010 | Koo et al. |
| 2011/0128941 | A1 | 6/2011 | Ishii |

FOREIGN PATENT DOCUMENTS

| | | |
|---|---|---|
| WO | WO2007037171 | 4/2007 |
| WO | WO2008012954 | 1/2008 |
| WO | WO2009022669 | 2/2009 |
| WO | WO2010090566 | 8/2010 |

OTHER PUBLICATIONS

Search Report dated Aug. 9, 2011.

Chen et al: "Packet Scheduling for Video Streaming Over Wireless Content-Aware Packet retry Limit", Natl Tsing Hua Univ / Dept Elect Engn, Workshop on Multimedia Signal Processing, pp. 409-414 2006, IEEE.

Lu et al: "A time-based adaptive retry strategy for video streaming in 802.11 Wlans", Carnegie Mellon Univ / Elect & Comp Engn Dept, Wireless Communications & Mobile Computing / 7 (2): pp. 187-203 Feb. 2007John Wiley & Sons Inc.

Lu et al_: "IDEO Streaming Over 802.11 WLAN With Content-Aware Adaptive Retry", Carnegie Mellon Univ / dept Elect & Comp Engn, 2005 IEEE International Conference on Multimedia and Expo (ICME), vols. 1 and 2, pp. 723-726.

* cited by examiner

PACKET RETRANSMISSION METHOD IN A WIRELESS TRANSMITTER

This application claims the benefit, under 35 U.S.C. §365 of International Application PCT/EP2011/060261, filed Jun. 20, 2011, which was published in accordance with PCT Article 21(2) on Dec. 22, 2011 in English and which claims the benefit of European patent application No. 10447015.8, filed Jun. 18, 2010 and European patent application No. 10447018.2, filed Aug. 13, 2010.

FIELD OF THE INVENTION

The present invention relates generally to wireless transmissions and in particular to a retransmission mechanism.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

A residential gateway is adapted to connect a residential network to the Internet. It permits to receive and distribute in the residential network some video content transported over the Internet protocol (IP). Inside the residential network the video may be transported over a wired or wireless network. If wired networks have showed to be suitable for transporting video services, it requires home devices to be plugged to the wired network. This is not adapted to devices mobility. Wireless technologies, such as IEEE802.11 are more convenient to reach mobile device in a local network, but they don't provide enough quality of service required for video applications. In particular, wireless interferences degrade the wireless transmissions, and as a result the video quality. The IEEE802.11 standard on Wireless LAN Medium Access Control (MAC) and Physical Layer (PHY) Specifications dated Jun. 12, 2007, noted 802.11 herein below, defines a retransmission mechanism in chapter 9.2.5.3 on recovery procedures and retransmit limits. Retransmission mechanism is part of the distributed coordination function (DCF) mechanism defined in chapter 9.2. In particular, in a frame exchange, the transmitter performs the error recovery mechanism by retrying transmissions for a frame exchange sequence. It performs retransmission until the retransmission is successful or a retry limit is reached. The retry limit is usually set to seven. This mechanism is not sufficient to enable an acceptable video frames transfer over the wireless medium.

SUMMARY OF THE INVENTION

The present invention attempts to remedy at least some of the concerns connected with packet transmission in the prior art, by providing a transmission mechanism adapted for video services.

The invention concerns a retransmission mechanism that enhances the quality of service on wireless networks for video services.

To this end, the invention relates to a method at a wireless device for transmitting a packet, the method comprising the steps of setting a lifetime value to a packet to transmit; transmitting the packet. According to the invention, if the transmission fails, and while the packet retransmission fails and the packet lifetime has not expired, the method comprises the steps of retransmitting the packet up to a retry limit, and waiting a pause time before retransmitting the packet up to a retry limit.

Surprisingly, and in contrast to what is usually done in wireless transmission systems, the retransmission is performed in several steps, comprising multiple retransmissions. It is not based on multiple continuous packet reemissions. It suspends and resumes retransmission to bypass the interference period. It has been shown that the retransmission mechanism provides a better quality of service for video services. Instead of retransmitting a packet several times in a short interval, the mechanism delays the retransmissions. This enables at least to successively pass some interference problems.

This retransmission mechanism has proved to be useful when used with video transmission. It significantly reduces packet error rate. This retransmission mechanism also advantageously saves the wireless medium, in contrast with what a standard implementation would do.

According to an embodiment of the invention, the pause time corresponds to the time needed to transmit a packet a number of a retry limit times.

According to another embodiment of the invention, the pause time corresponds to the time needed to transmit a packet a number of a retry limit times at the lowest transmission rate.

According to an embodiment of the invention, the method is performed for audio and video packets only.

Another object of the invention is a wireless device comprising a wireless interface for communicating in a wireless network, and retransmission means for setting a lifetime value to a packet to transmit and while the packet lifetime has not expired and the packet transmission fails, transmitting the packet up to a retry limit, and suspending transmitting the packet during a pause time before transmitting the packet up to a retry limit.

According to an embodiment, the wireless device comprises Interference detecting means for detecting interferences in the wireless network.

Another object of the invention is a computer program product comprising program code instructions for executing the steps of the method according to the invention, when that program is executed on a computer. By "computer program product", it is meant a computer program support, which may consist not only in a storing space containing the program, such as a computer memory, but also in a signal, such as an electrical or optical signal.

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

BRIEF DESCRIPTION OF THE DRAWINGS

The invention will be better understood and illustrated by means of the following embodiment and execution examples, in no way limitative, with reference to the appended figures on which:

In FIG. 1, the represented blocks are purely functional entities, which do not necessarily correspond to physically separate entities. Namely, they could be developed in the form of hardware or software, or be implemented in one or several integrated circuits.

DETAILED DESCRIPTION OF PREFERRED EMBODIMENTS

It is to be understood that the figures and descriptions of the present invention have been simplified to illustrate elements that are relevant for a clear understanding of the present invention, while eliminating, for purposes of clarity, many other elements found in typical digital multimedia content delivery methods and systems. However, because such elements are well known in the art, a detailed discussion of such elements is not provided herein. The disclosure herein is directed to all such variations and modifications known to those skilled in the art.

The exemplary embodiment comes within the framework of IEEE802.11, but the invention is not limited to this particular environment and may be applied within other frameworks where retransmission occurs in a manner similar to the one defined in the IEEE802.11 standard.

Figure 1:
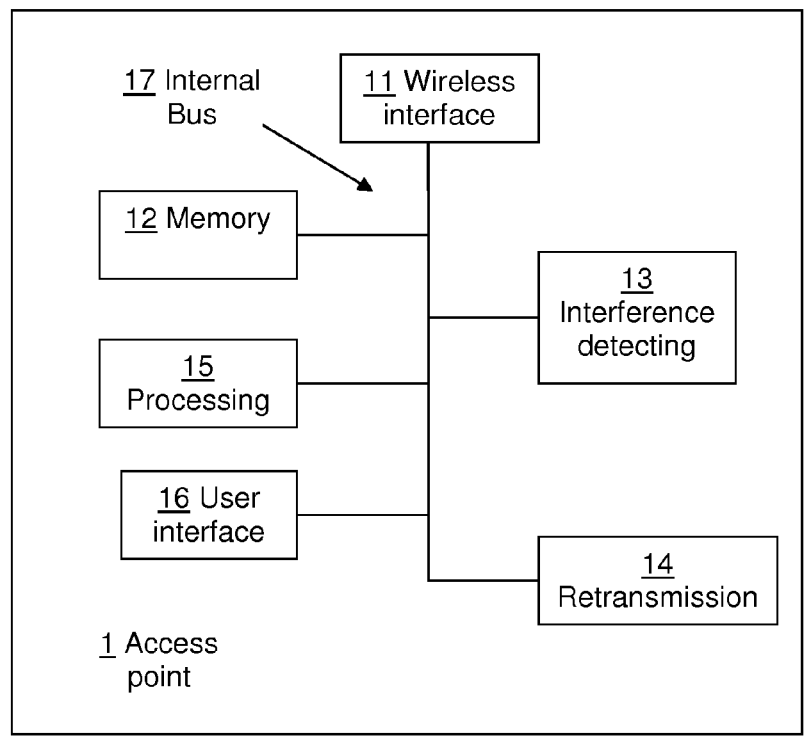
FIG. 1 is a block diagram of an access point compliant with the embodiment.

The access point, AP, device 1 according to the embodiment is illustrated in FIG. 1. It comprises a wireless interface 11 compliant to the IEEE 802.11 standard. The AP 1 comprises an interference detecting module 13 that is adapted to detect interferences in the wireless medium. Interference detection mechanism is out of the scope of the invention. The AP comprises a retransmission module 14 that is adapted to perform retransmission as described hereinafter. The Interference detection module is also adapted to inform the retransmission module when an interference has been detected. The AP 1 also comprises a memory 12 for storing packets that are transmitted on the wireless medium.

Even if the embodiment applies to an AP, the mechanism of the embodiment applies to a wireless station as well.

The retransmission mechanism according to the embodiment is now described. The retransmission module controls two parameters. The first parameter is the packet lifetime. The packet lifetime corresponds to the time the packet is stored in memory. When the packet lifetime expires, and if the packet has not been transmitted, the packet is removed from the memory. When the packet is transmitted it is dropped from the memory.

The packet lifetime may be chosen according to the following constraints. It is longer than the interference duration that can usually be expected. It is smaller than the maximum AP buffer capacity; which depends on the video bandwidth and the available memory. And, it is smaller than the amount of video buffered on the receiving station. In particular, some values may be as follows: a buffer capacity on the AP of around 5 seconds, a buffer capacity on the video player around 10 seconds, and a packet lifetime of 2.5 seconds.

The second parameter is a retransmission_suspend value. It defines the time the AP suspends transmissions between two series of retransmission.

Figure 3:
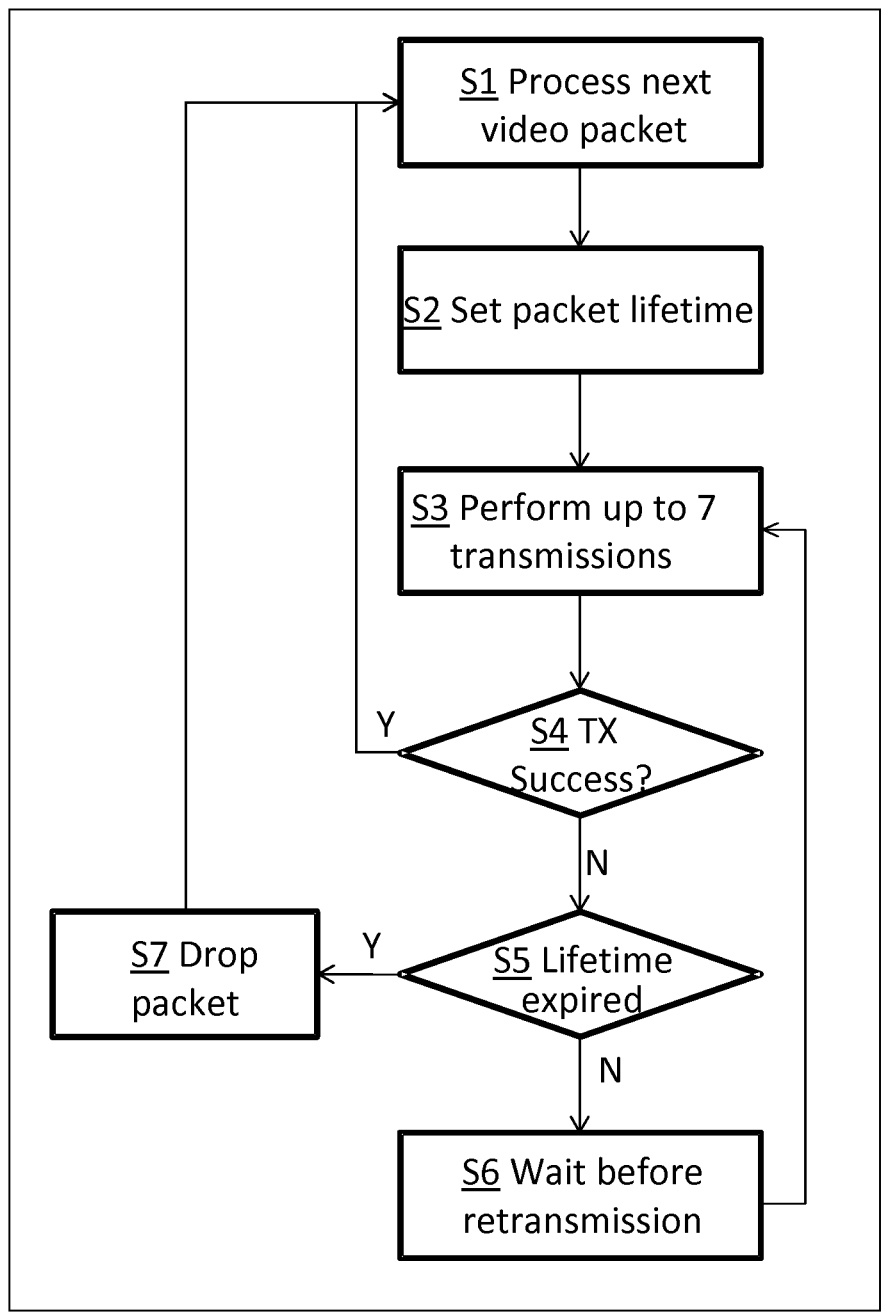
FIG. 3 is a flow diagram of a retransmission mechanism according to the embodiment.

The mechanism is summarized as follows, as illustrated in FIG. 3. The AP has a packet to transmit to a station, step S1. It sets a packet lifetime value to the packet, step S2. The packet has not been correctly received by the station; this is detected by the AP because the AP has not received an acknowledgment packet. The AP retransmits the packet according to the mechanism defined in the IEEE802.11 specification, step S3. If necessary it retransmits the packet up to the retry limit. If the retransmission succeeds, the AP may send the next packet, step S4. If the retransmission still fails, the Interference detecting module informs the retransmission module that interference is occurring. The retransmission mechanism according to the embodiment is setup. If the packet lifetime expires, step S5, the AP drops the packets and transmits the next one. While the packet lifetime doesn't expire, the AP suspends the retransmissions, step S6, and starts another set of retransmissions, step S3. The retry limit of the embodiment concerns the ShortRetryLimit parameter defined in chapter 9.2.4 of the IEEE 802.11 standard. Of course this mechanism could apply to the LongRetryLimit parameter as well.

Figure 2:
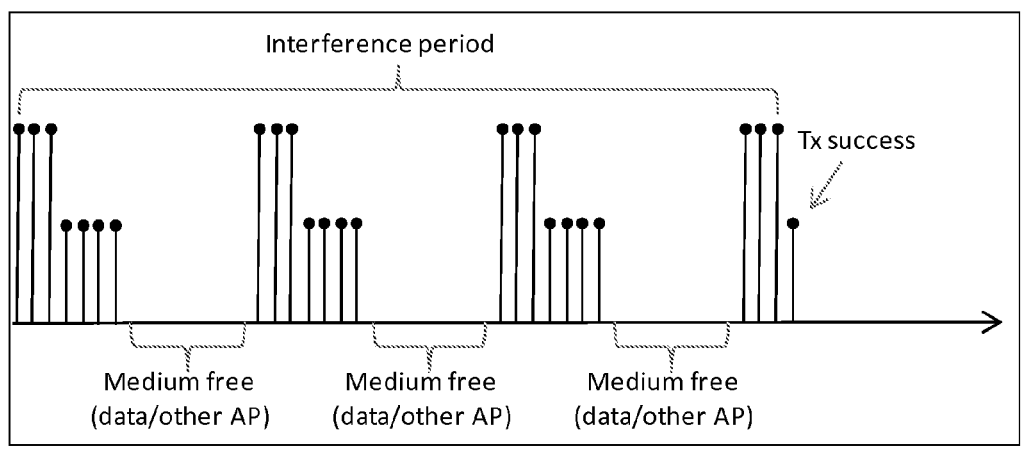
FIG. 2 illustrates a retransmission mechanism according to the embodiment.

The AP device sends several series of retransmission packets, spaced out by pause periods. This is illustrated in FIG. 2, where each vertical line corresponds to a transmission attempt and the line height indicates the transmit rate. The rate can be modified inside a series of retransmissions or between two series. As indicated in FIG. 2, the AP manages to send a retransmission packet after twenty four failed retransmissions. The retransmissions have been grouped into series of seven retransmissions. If the seventh retransmission fails, the AP suspends retransmitting until it starts another set of retransmissions. Between the series of retransmissions it lets the medium free. During this pause, the same AP can transmit data to other associated stations or other devices in the same channel may transmit data. The AP doesn't pollute the wireless medium with useless retransmission, and enables other devices to use the medium.

This corresponds to using the standard retransmission mechanism several times, with a retry limit value set to seven. In the standard mechanism, after the retry limit has been reached, the packet is removed. Here the AP uses several times the standard retransmission mechanism, with pauses in between, until the packet lifetime has been reached.

The mechanism is configurable per quality of service (QoS) class. The IEEE802.11 standard, and in particular the IEEE802.11e on Medium Access Control on Quality of Services Enhancements, defines four classes: background, best effort, voice and video. According to the embodiment, the video and voice traffic class use this mechanism, the background and best effort traffic class don't use it. A proper implementation that supports transmitting video to multiple stations simultaneously must have four QoS queues per station, so that transmit problems to one station do not impact video quality on another one.

The pause between two series of retransmissions may be as long as the time needed for one series of retransmissions. For example, the retransmission_suspend value may be set to 25 milliseconds.

In particular the pause time corresponds to the time needed to transmit a series of retransmission packet at the lowest transmission rate of the BSSBasicRateSet that is defined in 7.3.2.2 of the IEEE802.11 specification. This corresponds to the time needed for a series of retransmissions in the worst case.

In other words, the AP according to the embodiment is a standard AP with in addition a retransmission module and an interference detecting module. A standard AP comprises a recovery module that performs retransmission as defined in the IEEE802.11 standard; using among others a retry limit parameter. A standard AP performs retransmission up to a retry limit.

The retransmission module performs retransmission, using the features of the recovery module. In particular it first asks the recovery module to perform retransmission up to the retry limit. If the retransmission doesn't succeed, it again asks the recovery module to perform retransmission. More generally, the retransmission module is adapted to drive the recovery module, according to parameters such as the retransmission_suspend value, the retry limit number and the packet lifetime. The retransmission_suspend value may be configurable through the AP user interface.

The retransmission module may also check, before using the retransmission mechanism according to the embodiment, that the receiver supports that retransmission mechanism. It checks the buffering capacity of the receiver to evaluate the maximum packet lifetime that can be set. If the packet lifetime would be too short, the retransmission mechanism is not used, and the standard recovery procedure is used only. This may be performed in any proprietary manner that is out of the scope of the invention.

References disclosed in the description, the claims and the drawings may be provided independently or in any appropriate combination. Features may, where appropriate, be implemented in hardware, software, or a combination of the two.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

The invention claimed is:

1. A method for retransmitting a packet by a wireless device, said method comprising:
    setting a lifetime value to said packet;
    while the packet lifetime has not expired, retransmitting the packet using a first set of packet retransmissions until the retransmitting of the packet succeeds, wherein each of the packet retransmissions in the first set of the packet retransmissions is separated by a first pause period; and wherein if the packet has been retransmitted a number of retry limit times for the first set of the packet retransmissions,
    waiting for a second pause period before starting a next set of packet retransmissions, wherein each of the packet retransmissions in the next set of the packet retransmissions is also separated by the first pause period; and
    wherein rate of transmission is modified inside the first set of the retransmissions or between two sets of the retransmissions.

2. The method according to claim 1, wherein said second pause period corresponds to a time needed to retransmit said packet said number of a retry limit times.

3. The method according to claim 1, wherein said packet can be sent at a plurality of transmission rates, and said second pause period corresponds to a time needed to transmit said packet a number of a retry limit times at a lowest available transmission rate chosen from among said plurality of transmission rates.

4. The method according to claim 1, further comprising discarding said packet when the packet lifetime expires or when the retransmitting of the packet succeeds.

5. The method according to claim 1, said method being performed for audio and video packets only.

6. A wireless device for retransmitting a packet comprising:
    a wireless interface for communicating in a wireless network,
    a retransmission module for:
        setting a lifetime value to said packet;
        while the packet lifetime has not expired, retransmitting the packet using a first set of packet retransmissions until the retransmitting of the packet succeeds, wherein each of the packet retransmissions in the first set of the packet retransmissions is separated by a first pause period; and wherein if the packet has been retransmitted a number of retry limit times for the first set of the packet retransmissions, waiting for a second pause period before starting a next set of packet retransmissions, wherein each of the packet retransmissions in the next set of the packet retransmissions is also separated by the first pause period, said retransmission module in communication with said wireless interface; and
    wherein rate of transmission is modified inside the first set of the retransmissions or between two sets of the retransmissions.

7. The wireless device according to claim 6, wherein said packet can be transmitted at a plurality of transmission rates, and said second pause period corresponds to a time needed to transmit said packet the number of a retry limit times at a lowest available transmission rate chosen from among the plurality of transmission rates.

8. The wireless device according to claim 6, said wireless interface being adapted to communicate to an IEEE 802.11 compliant wireless network.

9. A wireless device for retransmitting a packet, comprising:
    a wireless interface for communicating in a wireless network,
    a retransmission module for performing the retransmitting of the packet according to a first mode or a second mode, wherein;
    in the first mode the retransmission module sets a lifetime value for said packet, and while the packet lifetime has not expired, said retransmission module retransmits said packet until the retransmitting of the packet succeeds, and said retransmission module discards the packet if the packet has been retransmitted a number of retry limit times;
    in the second mode the retransmission module sets a lifetime value for said packet, and while the packet lifetime has not expired, said retransmission module retransmits the packet using a first set of packet retransmissions until the retransmitting of the packet succeeds, wherein each of the packet retransmissions in the first set of the packet retransmissions is separated by a first pause period; and wherein if the packet has been retransmitted a number of retry limit times for the first set of the packet retransmissions and if said packet retransmission has not been successful, said retransmission module waits for a second pause time before starting a next set of retransmissions, wherein each of the packet retransmissions in the next set of the packet retransmissions is also separated by the first pause period, said retransmission module in communication with said wireless interface; and wherein rate of transmission is modified inside the first set of the retransmissions or between two sets of the retransmissions.

10. The wireless device according to claim 9, further comprising an interference detection module for detecting interferences in the wireless network, said interference detection module in communication with said retransmission module and with said wireless interface, said interference detection module informing said retransmission module when an interference is detected in the wireless network, so that while no interference has been detected said retransmission module retransmits the packet according to the first mode, and when an interference is detected, said retransmission module retransmits the packet according to the second mode.

* * * * *